US009667497B2

(12) United States Patent
Petrick et al.

(10) Patent No.: US 9,667,497 B2
(45) Date of Patent: May 30, 2017

(54) VIRTUAL CONTROLLER GROUP MANAGEMENT SYSTEM

(71) Applicant: Dell Products L.P., Round Rock, TX (US)

(72) Inventors: Christopher Stephen Petrick, Cedar Park, TX (US); Rajkumaran Chandrasekaran, Tamil Nadu (IN); Vadim Ivanov, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 138 days.

(21) Appl. No.: 14/590,702

(22) Filed: Jan. 6, 2015

(65) Prior Publication Data

US 2016/0197785 A1    Jul. 7, 2016

(51) Int. Cl.
*H04L 12/28*    (2006.01)
*H04L 12/24*    (2006.01)

(52) U.S. Cl.
CPC ...... *H04L 41/0893* (2013.01); *H04L 41/0859* (2013.01)

(58) Field of Classification Search
USPC ......... 370/229–255, 338–401; 709/208–222; 714/37–57
See application file for complete search history.

(56) References Cited

U.S. PATENT DOCUMENTS

| | | | |
|---|---|---|---|
| 6,377,548 B1 * | 4/2002 | Chuah | H04L 12/2602 370/233 |
| 6,795,689 B1 * | 9/2004 | Ogren | H04W 24/00 370/331 |
| 7,571,308 B1 * | 8/2009 | Bahl | H04L 29/12273 709/227 |

(Continued)

FOREIGN PATENT DOCUMENTS

WO    WO2014009250    1/2014

OTHER PUBLICATIONS

"Ensuring Nonstop System-Level Reliability for Wireless LANS: Providing Enterprise-Wide Continuous Wireless System Availability Under All Conditions With Virtual Controller Cluster," Aug. 2011, pp. 1-5, Juniper Networks, Inc.

(Continued)

*Primary Examiner* — Man Phan
(74) *Attorney, Agent, or Firm* — Haynes and Boone, LLP (57) ABSTRACT

An access point information handling system (IHS) group management system includes a group management IHS that is coupled to a plurality of access point IHSs through a network. The group management IHS receives a group request from a first access point IHS, then retrieves group configuration information from the group configuration database using information about the first access point IHS, and uses the group configuration information to determine an access point IHS group. The access point IHS group includes the first access point IHS and at least one second (Continued)

access point IHS. The group management IHS then determines an access point IHS group controller that is one of the first access point IHS and the at least one second access point IHS. The group management IHS then identifies the access point IHS group and the access point IHS group controller to the first access point IHS.

20 Claims, 3 Drawing Sheets

(56) References Cited

U.S. PATENT DOCUMENTS

| | | | |
|---|---|---|---|
| 7,574,491 B2* | 8/2009 | Stein | H04L 41/0869 709/217 |
| 7,724,670 B2* | 5/2010 | Nilakantan | H04L 45/04 370/235 |
| 7,944,918 B2* | 5/2011 | Cabeca | H04L 12/4645 370/389 |
| 8,027,248 B2 | 9/2011 | Balasubramanian et al. | |
| 8,539,548 B1* | 9/2013 | Overby, Jr. | G06F 21/6218 726/1 |
| 8,612,738 B2* | 12/2013 | Nilakantan | H04L 67/34 370/389 |
| 2015/0142178 A1* | 5/2015 | Peterson | G06F 1/26 700/275 |
| 2015/0334084 A1* | 11/2015 | Bigall | H04L 41/0803 709/220 |

OTHER PUBLICATIONS

"Cisco Small Business Wireless Access Points," 2013, pp. 1-4, Cisco.

* cited by examiner

VIRTUAL CONTROLLER GROUP MANAGEMENT SYSTEM

BACKGROUND

The present disclosure relates generally to information handling systems, and more particularly to a virtual controller group management system for grouping a plurality of information handling systems.

As the value and use of information continues to increase, individuals and businesses seek additional ways to process and store information. One option available to users is information handling systems. An information handling system (IHS) generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Some IHSs include network connectivity and control functionality that allows those IHSs to communicate with other IHSs in order to coordinate into controller groups such that one of the IHSs in the controller group may control at least some functions of the other IHSs in that controller group. For example, wireless access point IHSs allow wireless devices to connect to a wired network using wireless communication technologies (e.g., WiFi wireless communication technologies), and some wireless access point IHSs may be configured to communicate with each other to form an access point IHS group that provides a user the ability to access the wired network over a larger physical area than any single access point IHS may provide while only having to provide a single set of access credentials. The conventional grouping of access point IHSs to form an access point IHS group raises a number of issues.

For example, there are no industry standards for grouping access point IHSs into an access point IHS group and, as such, solutions for doing so are vendor/manufacturer specific and require that each of the access point IHSs being grouped into a particular access point IHS group be provided from the same vendor/manufacturer. Furthermore, each of the access point IHSs to be grouped into an access point IHS group must be provided access to the same broadcast domain (e.g., the same virtual local area network (VLAN)) to allow each access point IHS to broadcast to the other access point IHSs in that broadcast domain so that the access point IHSs may communicate to determine an access point IHS group and elect an access point IHS group controller. The use of broadcast domains to enable the access point IHS-to-access point IHS communications that are necessary to set up an access point IHS group and elect an access point IHS group controller results in the designation of scarce broadcast domains for this function when they could otherwise be used for other applications, and requires that access point IHSs that are to be grouped into an access point IHS group be connected to the same network infrastructure.

Accordingly, it would be desirable to provide an improved controller group management system.

SUMMARY

According to one embodiment, an information handling system includes a database storing group configuration information; a network interface coupled to a network; a processing system coupled to each of the database and the network interface; and a non-transitory, computer-readable medium including instructions that, when executed by the processing system, cause the processing system to provide a group management engine that is configured to: receive a group request from a first access point IHS through the network using the network interface; retrieve the group configuration information from the database using information about the first access point IHS; determine an access point IHS group using the group configuration information, wherein the access point IHS group includes the first access point IHS and at least one second access point IHS that is coupled to the network; determine an access point IHS group controller that is one of the first access point IHS and the at least one second access point IHS; and identify the access point IHS group and the access point IHS group controller to the first access point IHS through the network using the network interface

DETAILED DESCRIPTION

For purposes of this disclosure, an information handling system may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touchscreen and/or a video display. The information handling system may also include one or more buses operable to transmit communications between the various hardware components.

Figure 1:
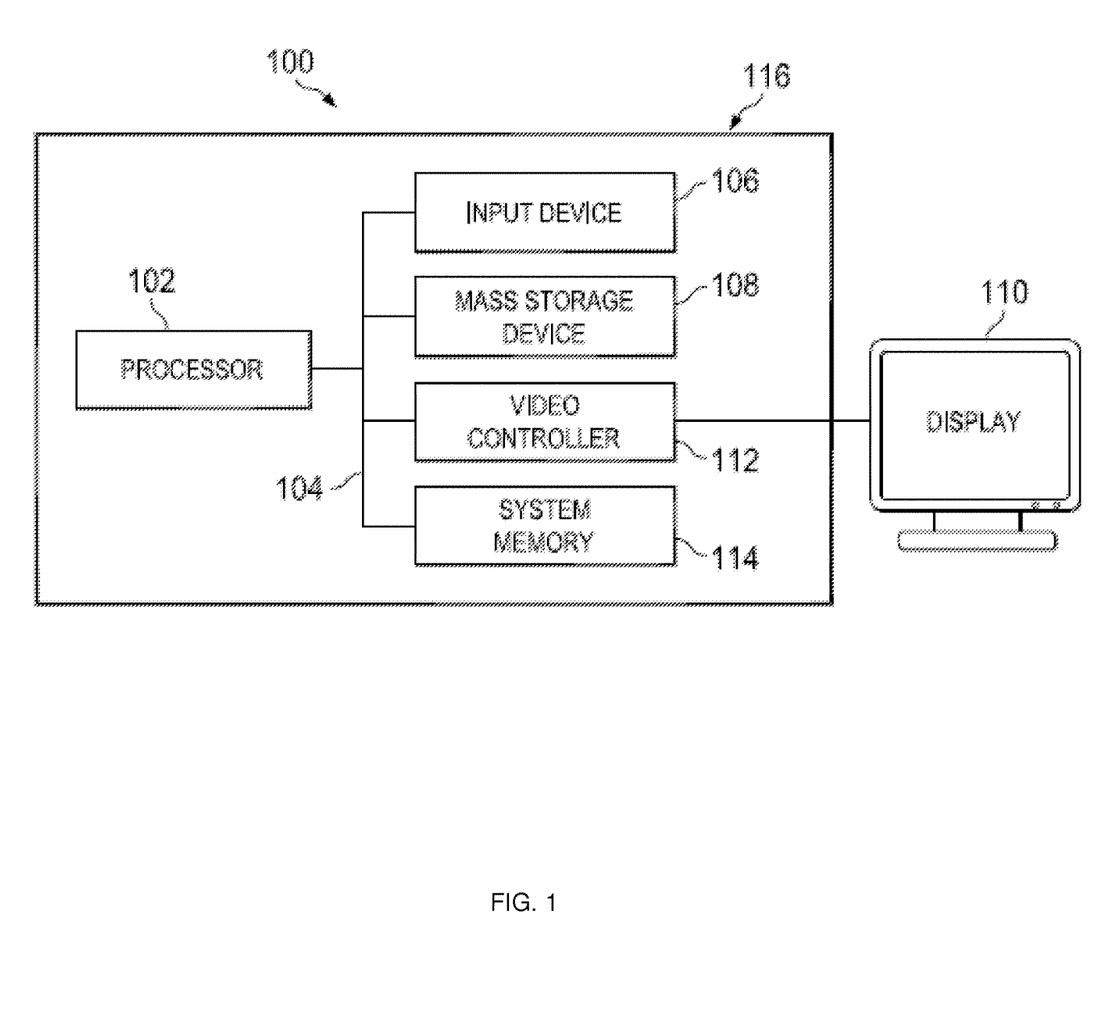
FIG. 1 is a schematic view illustrating an embodiment of an information handling system.

In one embodiment, IHS 100, FIG. 1, includes a processor 102, which is connected to a bus 104. Bus 104 serves as a connection between processor 102 and other components of IHS 100. An input device 106 is coupled to processor 102 to provide input to processor 102. Examples of input devices may include keyboards, touchscreens, pointing devices such as mouses, trackballs, and trackpads, and/or a variety of other input devices known in the art. Programs and data are stored on a mass storage device 108, which is coupled to processor 102. Examples of mass storage devices may include hard discs, optical disks, magneto-optical discs, solid-state storage devices, and/or a variety other mass storage devices known in the art. IHS 100 further includes a display 110, which is coupled to processor 102 by a video controller 112. A system memory 114 is coupled to processor 102 to provide the processor with fast storage to facilitate execution of computer programs by processor 102. Examples of system memory may include random access memory (RAM) devices such as dynamic RAM (DRAM), synchronous DRAM (SDRAM), solid state memory devices, and/or a variety of other memory devices known in the art. In an embodiment, a chassis 116 houses some or all of the components of IHS 100. It should be understood that other buses and intermediate circuits can be deployed between the components described above and processor 102 to facilitate interconnection between the components and the processor 102.

Figure 2:
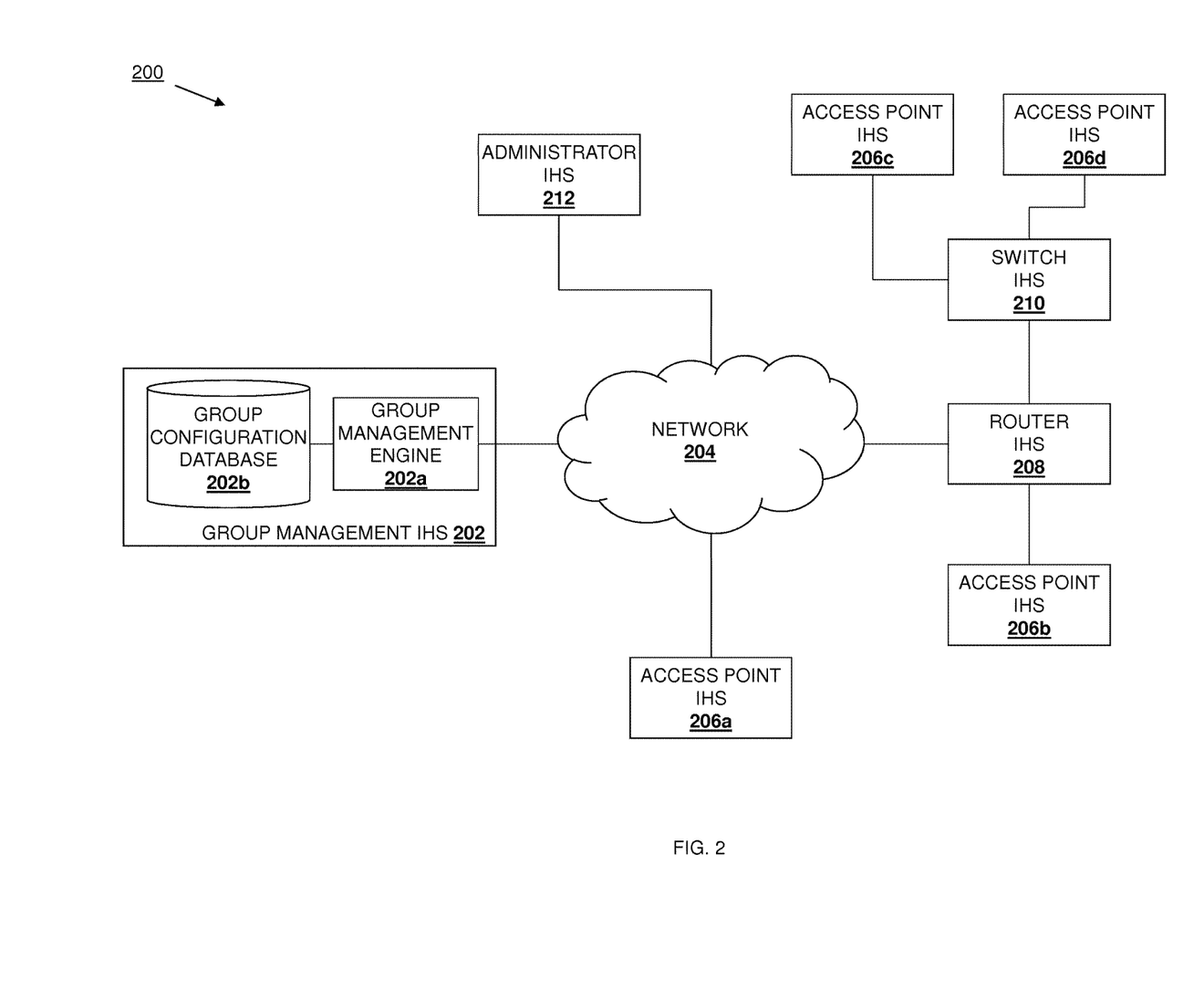
FIG. 2 is a schematic view illustrating an embodiment of a virtual controller group management system.

Referring now to FIG. 2, an embodiment of a virtual controller group management system that, in the specific example provided below is an access point IHS group management system 200, is illustrated. The access point IHS group management system 200 includes a group management IHS 202 that may include one or more of the IHS's 100 discussed above with reference to FIG. 1 and/or that may include some or all of the components of the IHS 100. For example, the group management IHS 202 may include one or more server IHSs that are connected to a network 204 to provide a distributed processing and storage system that may be referred to as a "cloud" computing system that provides for Internet-based computing using one or more remote server IHSs that are networked to allow for the sharing of data-processing tasks, data storage, and network access to computing services and/or resources. However, a single computing system, as well as other types of distributed computing systems, may be used to provide the group management IHS 202 while remaining within the scope of the present disclosure.

The group management IHS 202 in the illustrated embodiment includes a group management engine 202a that may be provided by one or more dedicated circuits, processing systems, or other IHS modules that have been configured to perform the functions of the group management engine 202a discussed below. In other embodiments, the group management IHS 202 may include a processing system (e.g., the processor 102 of FIG. 1) and a memory system (e.g., the system memory 114 of FIG. 1) that includes instructions that, when executed by the processing system, cause the processing system to provide the group management engine 202a that is configured to perform the functions of the group management engines discussed below. The group management IHS 202 also includes a group configuration database 202b that is coupled to the group management engine 202a and that is configured to store the group configuration information discussed below.

As discussed above, the group management engine 202a is coupled (e.g., via a coupling to the processing system, circuit, or other IHS module used to provide the group management engine 202a) to the network 204 (e.g., a Local Area Network (LAN), the Internet, etc.) via a network interface (not illustrated, but which may include a network interface controller (NIC) or other network interface device known in the art). The network 204 may also be coupled to a wide variety of virtual controller group IHSs. In the examples provided below, those virtual controller group IHSs are illustrated and described as access point IHSs that allow wireless devices to connect to a wired network using wireless communication technologies (e.g., WiFi wireless communication technologies). However, the systems and methods described herein will be beneficial for any network-connected devices that include group controller functionality (e.g., Internet interconnected and embedded computing device systems sometimes referred to as the "Internet of things", cellular and/or mobile telephone systems, and/or a variety of other group controller systems known in the art), and thus the application of the systems and methods taught herein to such devices will fall within the scope of the present disclosure.

In the illustrated embodiment, a plurality of access point IHS 206a, 206b, 206c, and 206d are coupled to the network 204, any or all of which may be the IHS 100 discussed above with reference to FIG. 1 and/or which may include some or all of the components of the IHS 100. For example, the access point IHS 206a is coupled directly to the network 204, the access point IHS 206b is coupled to the network 204 through a router IHS 208 (which may be the IHS 100 discussed above with reference to FIG. 1 and/or which may include some or all of the components of the IHS 100), and the access point IHSs 206c and 206d are coupled to the network 204 through a switch IHS 210 (which may be the IHS 100 discussed above with reference to FIG. 1 and/or which may include some or all of the components of the IHSs 100) that is coupled to the router IHS 208. While only four access point IHSs are illustrated in the access point IHS group management system 200, one of skill in the art in possession of the present disclosure will recognize that any number of access point IHSs may be included in the access point IHS group management system 200 while remaining within the scope of the present disclosure. Furthermore, in some embodiments the access point IHSs 206a-d may be access point IHSs provided by the same vendor (e.g., Cisco Systems®, Inc. of San Jose, Calif., D-Link® Corporation of Taipei, Taiwan, etc.), while in other embodiments the access point IHSs 206a-d may be access point IHSs provided by different vendors. Further still, in some embodiments each of the access point IHSs 206a-d may be connected to the same infrastructure (e.g., a LAN in a single building), while in other embodiments the access point IHSs 206a-d may be geographically dispersed (e.g., connected to LANs in different locations such as, for example, different buildings, different cities, different countries, etc.). An administrative IHS 212 is coupled to the network 204 and may be operated by an administrator user of the access point IHS group management system 200, discussed in further detail below.

Figure 3:
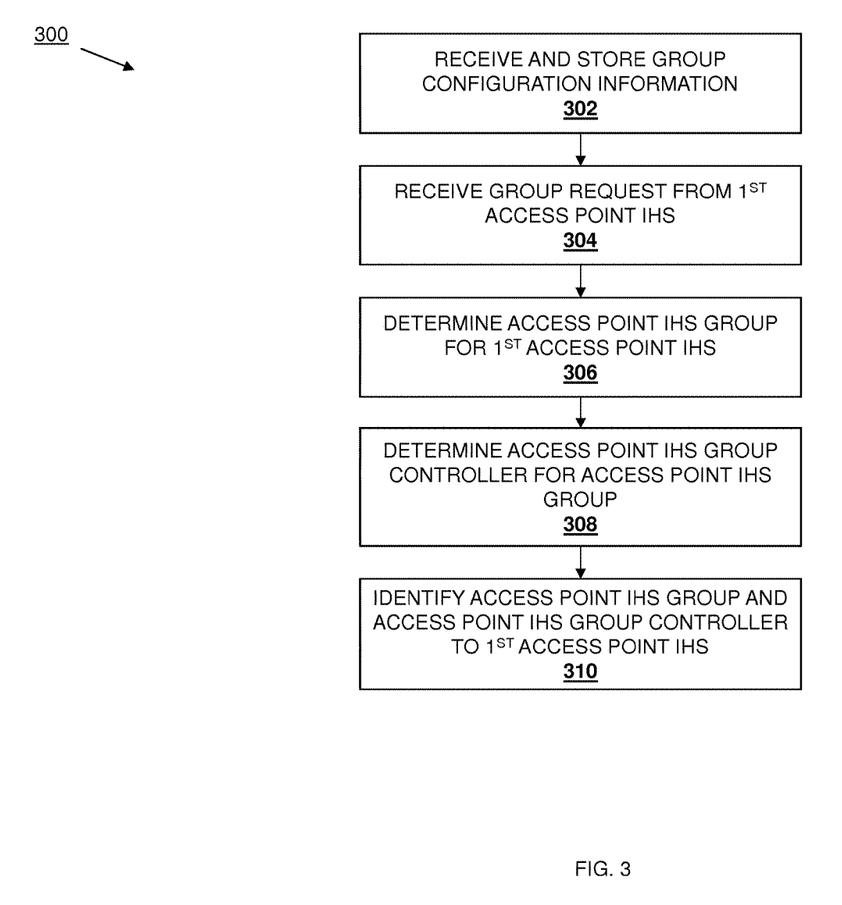
FIG. 3 is a flow chart illustrating an embodiment of a method for managing virtual controller groups.

Referring now to FIG. 3, and with reference to FIG. 2, an embodiment of a method 300 for grouping access point IHSs is illustrated. As discussed in further detail below, the access point IHSs 206a-d may be grouped together into access point IHS groups (also referred to as virtual controller groups in some embodiments) that operate to associate the access point IHSs and allow for their control by an access point IHS group controller (also referred to as a virtual controller in some embodiments). However, rather than utilizing conventional proprietary vendor/manufacturer-specific implementations that require each access point IHS in the access point IHS group/virtual controller group be provided by the same vendor/manufacturer, connected to the same infrastructure (e.g., the same LAN), and assigned to the same broadcast domain in order to allow those access point IHSs to communicate with each other to determine their access point IHS group/virtual controller group and elect an access point IHS group controller/virtual controller, the system 200 and method 300 of the present disclosure provides the information needed to determine access point IHS groups/virtual controller groups and access point IHS group controllers/virtual controllers on the group management IHS 202, while allowing each access point IHS 206*a*-*d* to communicate separately with the group management IHS 202 to determine their respective access point IHS group/virtual controller group and access point IHS group controller/virtual controller. One of skill in the art in possession of the present disclosure will recognize that grouping access point IHSs via the systems and methods described herein provide a vendor/manufacturer-neutral implementation that allows access point IHSs that are provided by different vendors/manufacturers and that are connected to different and sometimes geographically disperse infrastructures to be grouped into access point IHS groups/virtual controller groups without the need to assign those access point IHSs the same broadcast domain, thus saving scarce broadcast domains for use with other applications.

The method 300 begins at block 302 where group configuration information is received and stored. In an embodiment of block 302, the group management engine 202*a* in the group management IHS 202 may receive group configuration information over the network 204 from the administrator IHS 212 and, in response, the group management engine 202*a* may store that group configuration information in the group configuration database 202*b*. For example, an administrator user of the administrator IHS 212 may use the administrator IHS 212 to define which access point IHSs 206*a*-*d* in belong to a particular access point IHS group, how and/or when the access point IHSs 206*a*-*d* in the access point IHS group management system 200 should be grouped into particular access point IHS groups, which access point IHS in an access point IHS group is the access point IHS group controller, how and/or when access point IHSs in an access point IHS group should be the access point IHS group controller, and/or any other information known in the art that may be used to define access point IHS groups/virtual controller groups and access point IHS group controllers/virtual controllers. While a few examples are provided below, one of skill in the art in possession of the present disclosure will recognize that a variety of different information may be provided as part of the group configuration information while remaining within the scope of the present disclosure.

In an embodiment, the group configuration information received and stored by the group management IHS 202 at block 302 may associate identifiers for each of a plurality of access point IHSs with an access point IHS group that includes those plurality of access point IHSs. For example, the administrator user of the administrator IHS 212 may define an access point IHS group, and then provide, select, or otherwise designate the Media Access Control (MAC) addresses for each of the plurality of access point IHSs 206*a*-*d* that the administrator user would like to belong to that access point IHS group. Furthermore, the administrator user may perform similar operations for each access point IHS group that the administrator user is configuring, setting up, or otherwise defining. While an example of MAC addresses as access point IHS identifiers has been provided, other identifiers such as, for example, Internet Protocol (IP) addresses, serial numbers, system names, and/or a variety of other identifiers known in the art may be used while remaining within the scope of the present disclosure. As such, in some embodiments of block 302, the administrator user may define a plurality of access point IHS groups, and may explicitly identify each access point IHS included in those access point IHS groups by providing associated identifiers for those access point IHSs.

In an embodiment, the group configuration information received and stored by the group management IHS 202 at block 302 may include non-identifier characteristics that define the access point IHSs to be included in an access point IHS group. For example, the administrator user of the administrator IHS 212 may define an access point IHS group, and then provide, select, or otherwise designate non-identifier characteristics (e.g., characteristics other than a MAC address) that define the access point IHSs that the administrator user would like to belong to that access point IHS group. Some non-identifier characteristics that may define access point IHSs to be included in an access point group may include device serial numbers, device model numbers, asset numbers, global positioning system (GPS) coordinates, customer/user contact information (e.g., phone number, name, address, email address, etc.), boot time (e.g., the time of day the device booted), device model types, device simple network management protocol (SNMP) management information base (MIB) object identifiers, Media Access Control (MAC) Addresses, Internet Protocol (IP) Address, device types, service tags, serial numbers, and/or a variety of other non-identifier characteristics known in the art. Furthermore, the administrator user may perform similar operations for each access point IHS group that the administrator user is configuring, setting up, or otherwise defining. While a few examples of non-identifier characteristics for defining access point IHSs in an access point IHS group have been provided, other non-identifier characteristics known in the art may be used while remaining within the scope of the present disclosure. As such, in some embodiments of block 302, the administrator user may define a plurality of access point IHS groups, and may implicitly identify each access point IHS included in those access point IHS groups by providing non-identifier characteristics for those access point IHSs.

In an embodiment, the group configuration information received and stored by the group management IHS 202 at block 302 may include rules that define how access point IHS groups are to be created to include access point IHSs. For example, the administrator user of the administrator IHS 212 may provide, select, or otherwise designate rules that define how and/or when an access point IHS group is created, and the access point IHSs that will belong to that access point IHS group. Some rules that may define access point IHS groups may include a rule to create access point IHS groups that include ten access point IHSs, a rule to create access point IHS groups from access point IHSs that are connected to designated infrastructures, a rule to create access point IHS groups from access point IHSs that have a service tag from a particular manufacturer or vendor and/or a serial number associated with the same user, a rule to create access point IHS groups from access point IHSs that are installed in a specific geographical region, and/or a variety of other rules known in the art. While a few examples of rules for defining access point IHS groups have been provided, other rules may be used while remaining within the scope of the present disclosure. As such, in some embodiments of block 302, the administrator user may explicitly and/or implicitly define access point IHS groups by providing rules for the creation of access point IHS groups and rules for the inclusion of access point IHSs in those access point IHS groups.

In an embodiment, the group configuration information received and stored by the group management IHS 202 at block 302 may provide an identifier for an access point IHS included in an access point IHS group that identifies the access point IHS in the access point IHS group that is the access point IHS group controller. For example, the administrator user of the administrator IHS 212 may, for any access point IHS group, designate the MAC address of the access point IHS that the administrator user would like to be the access point IHS group controller for that access point IHS group. Furthermore, for any access point IHS group, the administrator user may provide a plurality of identifiers for access point IHSs in the access point IHS group and rank and/or prioritize those identifiers in an access point IHS group controller priority to indicate which of those access point IHSs should be the access point IHS group controller if a higher ranked or prioritized access point IHS is unavailable or otherwise unable to act as the access point IHS group controller. As such, an access point IHS group controller priority may be provided in the group configuration information that designates a primary access point IHS group controller and at least one secondary access point IHS group controller, and that access point IHS group controller priority may provide a failover system that defines which access point IHSs take over as access point IHS group controller when the access point IHS that is currently operating as the access point IHS group controller fails. While an example of MAC addresses as access point IHS identifiers has been provided, other identifiers such as, for example, Internet Protocol (IP) addresses, serial numbers, system names, and/or a variety of other identifiers known in the art may be used while remaining within the scope of the present disclosure. As such, in some embodiments of block 302, the administrator user may explicitly identify the access point IHS and/or access point IHS priority that may be used to determine which of the access point IHSs in an access point IHS group is the access point IHS group controller at any given time.

In an embodiment, the group configuration information received and stored by the group management IHS 202 at block 302 may include non-identifier characteristics that define the access point IHS in an access point IHS group that is the access point IHS controller. For example, the administrator user of the administrator IHS 212 may, for any access point IHS group, provide, select, or otherwise designate non-identifier characteristics (e.g., characteristics other than a MAC address) that define the access point IHS that the administrator user would like to be the access point IHS group controller for that access point IHS group. Some non-identifier characteristics that may define an access point IHS as an access point IHS group controller of an access point IHS group may include may include device serial numbers, device model numbers, asset numbers, global positioning system (GPS) coordinates, customer/user contact information (e.g., phone number, name, address, email address, etc.), boot time (e.g., the time of day the device booted), device model types, device simple network management protocol (SNMP) management information base (MIB) object identifiers, Media Access Control (MAC) Addresses, Internet Protocol (IP) Address, device types, service tags, serial numbers, and/or a variety of other non-identifier characteristics known in the art. Furthermore, for any access point IHS group, the non-identifier characteristics may indicate which of the access point IHSs in that access point IHS group should be the access point IHS group controller if an access point IHS that was previously defined by those non-identifier characteristics as the access point IHS group controller becomes unavailable or otherwise unable to act as the access point IHS group controller. As such, an access point IHS group controller priority may be defined by non-identifier characteristics in the group configuration information that designates a primary access point IHS group controller and at least one secondary access point IHS group controller. While a few examples of non-identifier characteristics for defining access point IHSs in an access point IHS group as the access point IHS group controller have been provided, other non-identifier characteristics known in the art may be used while remaining within the scope of the present disclosure. As such, in some embodiments of block 302, the administrator user may implicitly identify the access point IHS and/or access point IHS priority that may be used to determine which of the access point IHSs in an access point IHS group is the access point IHS group controller at any given time.

In an embodiment, the group configuration information received and stored by the group management IHS 202 at block 302 may include rules that define an access point IHS in an access point IHS group that is the access point IHS group controller. For example, the administrator user of the administrator IHS 212 may provide, select, or otherwise designate rules that define which access point IHS in the access point IHS group should be the access point IHS group controller. Some rules that may define the access point IHS group controller in an access point IHS group may include a rule that the first access point IHS to register with a newly created access point IHS group should be the access point IHS group controller, a rule to select an access point IHS as an access point IHS group controller based on the model of the access point IHS, and/or a variety of other rules known in the art. Furthermore, for any access point IHS group, the rules may indicate which of the access point IHSs in that access point IHS group should be the access point IHS group controller if an access point IHS that was previously defined by those rules as the access point IHS group controller becomes unavailable. While a few examples of rules for defining access point IHS group controllers in access point IHS groups have been provided, other rules may be used while remaining within the scope of the present disclosure. As such, in some embodiments of block 302, the administrator user may explicitly and/or implicitly define access point IHS group controllers for an access point IHS group by providing rules for the selection of access point IHS group controllers for those access point IHS groups.

In some embodiments, the access point IHS group controller may not be defined or designated by the group configuration information, but rather that group configuration information may instead instruct the group management engine 202a to request the designation of an access point IHS group controller in response to the initiation of an access point IHS group including a plurality of access point IHSs. For example, the group configuration information received and stored by the group management IHS 202 at block 302 may include an instruction to send an access point IHS group controller designation request through the network 204 to the administrator IHS 212 in response to identifying to a plurality of access point IHSs that they are part of the same access point IHS group. As such, in some embodiments of block 302, the administrator user may provide instructions to the group management engine 202a to retrieve additional information in the course of starting up an access point IHS group and/or designating an access point IHS group controller for that access point IHS group.

Thus, the group configuration information that is received and stored at block 302 may include a variety of information that explicitly and/or implicitly describes access point IHS groups/virtual controller groups, and may include how and/or when access point IHS groups/virtual controller groups are created, which access point IHSs belong in a access point IHS group/virtual controller group, how and/or when access point IHSs should be included in a access point IHS group/virtual controller group, which access point IHS(s) is/are the access point IHS group controller/virtual controller, how and/or when access point IHS(s) is/are selected as the access point IHS group controller/virtual controller, and/or a variety of other access point IHS group/virtual controller group information known in the art. Furthermore, the group configuration information received and stored at block 302 may include different combinations of the information discussed above such that, for example, the group configuration information includes identifiers for access point IHSs included in an access point IHS group and/or designated the access point IHS group controller, non-identifier characteristics that define the access point IHSs that should be included in that access point IHS group and/or act as the access point IHS group controller, rules that define the access point IHSs that should be included in that access point IHS group and/or act as the access point IHS group controller, etc.

The method 300 then proceeds to block 304 where a group request is received from a first access point IHS. In an embodiment, the group management engine 202a in the group management IHS 202 may receive a group request over the network 204 from any of the access point IHSs 206a-d. For example, the access point IHS 206a may be powered on, reset, rebooted, and/or otherwise initiated and, in response, the access point IHS 206a is configured to send a group request through the network 204 to the group management engine 202a in the group management IHS 202. One of skill in the art in possession of the present disclosure will recognize that in conventional systems, upon initialization the access point IHS 206a would instead broadcast a message in their designated broadcast domain in order to communicate with the other access point IHSs 206b-d in order to configure the access point IHS group/virtual controller group and elect an access point IHS group controller/virtual controller. However the systems and methods of the present disclosure instead have initialized access point IHSs "go to the cloud" with a group request that is sent to the group management IHS 202 in order to retrieve an access point IHS group/virtual controller group and an access point IHS group controller/virtual controller. In an embodiment, the group request sent by the first access point IHS at block 304 may include an identifier for the first access point IHS (e.g., a MAC address of the first access point IHS), non-identifier characteristics for the first access point IHS (e.g., device serial numbers, device model numbers, asset numbers, global positioning system (GPS) coordinates, customer/user contact information (e.g., phone number, name, address, email address, etc.), boot time (e.g., the time of day the device booted), device model types, device simple network management protocol (SNMP) management information base (MIB) object identifiers, Media Access Control (MAC) Addresses, Internet Protocol (IP) Address, device types, service tags, serial numbers, etc.), and/or any other information described herein that may be utilized by the group management engine 202a and/or the group management IHS 202 in identifying access point IHS groups and/or access point IHS group controllers.

The method 300 then proceeds to block 306 where an access point IHS group is determined for the first access point IHS. In an embodiment, the group management engine 202a in the group management IHS 202 utilizes information in the group request that was received at block 304 to retrieve group configuration information from the group configuration database. For example, the group management engine 202a may retrieve an identifier (e.g., a MAC address) from the group request, determine that that identifier is included in group configuration information in the group configuration database 202b, and determine an access point IHS group that is associated with that identifier in the group configuration information in the group configuration database 202b. In another example, the group management engine 202a may retrieve non-identifier characteristics (e.g., device serial numbers, device model numbers, asset numbers, global positioning system (GPS) coordinates, customer/user contact information (e.g., phone number, name, address, email address, etc.), boot time (e.g., the time of day the device booted), device model types, device simple network management protocol (SNMP) management information base (MIB) object identifiers, Media Access Control (MAC) Addresses, Internet Protocol (IP) Address, device types, service tags, serial numbers, etc.) from the group request, determine that those non-identifier characteristics are included in group configuration information in the group configuration database 202b, and determine an access point IHS group that is associated with those non-identifier characteristics in the group configuration information in the group configuration database 202b. In another example, the group management engine 202a may apply information included in the group request and/or associated with the current situation of the system to rules included in group configuration information in the group configuration database 202b to determine an access point IHS group that is associated with the result of the application of the rules to that information and/or current situation.

In an embodiment, the access point IHS group determined at block 306 includes the first access point IHS (e.g., the access point IHS 206a) and at least one second access point IHS (e.g., at least one of the access point IHSs 206b-d). While the access point IHS group has been described as including only access point IHSs, in some embodiments, other devices and device types may be included in the access point IHS group determined at block 306. For example, the access point IHS group determined at block 306 may include the switch IHS 210 based on an identifier (e.g., a MAC address of the switch IHS 210) that is associated with that access point IHS group in the group configuration database 202b, based on non-identifier characteristics of the switch IHS satisfying non-identifier characteristics in the group configuration information in the group configuration database 202b, and/or based on the current situation and information about the switch IHS satisfying rules in the group configuration information in the group configuration database 202b. Similarly, the access point IHS group determined at block 306 may include the router IHS 208 and/or any other device in the access point IHS group management system 200. While a few examples have been provided, the determination of the access point group for the first access point at block 306 may utilize any information discussed above and/or any combination of that information while remaining within the scope of the present disclosure.

The method 300 then proceeds to block 308 where an access point IHS group controller is determined for the access point IHS group that was determined at block 306. In an embodiment, the group management engine 202a in the group management IHS 202 utilizes the group configuration information in the group configuration database to determine an access point IHS group controller for the access point IHS group. For example, the group management engine 202a may retrieve an identifier (e.g., an MAC address) from the group configuration information that designates the access point IHS that should be the access point IHS group controller in the access point IHS group, determine if the access point IHS having that identifier is currently operating as part of the access point IHS group and, if so, determine that that access point IHS is the access point IHS group controller. In another example, the group management engine 202a may retrieve non-identifier characteristics (e.g., device serial numbers, device model numbers, asset numbers, global positioning system (GPS) coordinates, customer/user contact information (e.g., phone number, name, address, email address, etc.), boot time (e.g., the time of day the device booted), device model types, device simple network management protocol (SNMP) management information base (MIB) object identifiers, Media Access Control (MAC) Addresses, Internet Protocol (IP) Address, device types, service tags, serial numbers, etc.) from the group configuration information that designate the access point IHS that should be the access point IHS group controller in the access point IHS group, determine if an access point IHS having those non-identifier characteristics is currently operating as part of the access point IHS group and, if so, determine that that access point IHS is the access point IHS group controller. In another example, the group management engine 202a may retrieves rules included in group configuration information that designate the access point IHS that should be the access point IHS group controller in the access point IHS group, determine if the current situation and an access point IHS currently operating as part of the access point IHS group satisfies those rules and, if so, determine that that access point IHS is the access point IHS group controller.

In some embodiments, the determination of the access point IHS group controller at block 308 may include a determination of and/or retrieval of an access point IHS group controller priority. For example, the group management engine 202a may determine and/or retrieve an access point IHS group controller priority from the group configuration information that includes a plurality of identifiers (e.g., MAC addresses) that designate the priority of access point IHSs that should be the access point IHS group controller in the access point IHS group, determine if any of the access point IHSs having those identifiers are currently operating as part of the access point IHS group and, if so, determine which of those access point IHSs has the highest priority and designate that highest priority access point IHS as the access point IHS group controller. In another example, the group management engine 202a may determine and/or retrieve an access point IHS group controller priority from the group configuration information that includes non-identifier characteristics (e.g., device serial numbers, device model numbers, asset numbers, global positioning system (GPS) coordinates, customer/user contact information (e.g., phone number, name, address, email address, etc.), boot time (e.g., the time of day the device booted), device model types, device simple network management protocol (SNMP) management information base (MIB) object identifiers, Media Access Control (MAC) Addresses, Internet Protocol (IP) Address, device types, service tags, serial numbers, etc.) that designate the access point IHSs that should be the access point IHS group controller in the access point IHS group, determine if any access point IHSs currently operating as part of the access point IHS group include those non-identifier characteristics and, if so, determine which of those access point IHSs has the highest priority (e.g., based on their non-identifier characteristics) and designate that highest priority access point IHS as the access point IHS group controller. In another example, the group management engine 202a may determine and/or retrieve an access point IHS group controller priority from the group configuration information that includes rules that designate the access point IHSs that should be the access point IHS group controller in the access point IHS group, determine if the current situation and any access point IHSs currently operating as part of the access point IHS group satisfy those rules and, if so, determine which of those access point IHSs has the highest priority (e.g., based on the rules) and designate that highest priority access point IHS as the access point IHS group controller.

In some embodiments of block 308, the group management engine 202a may request a designation of the access point IHS group controller for the access point IHS group determined at block 306. For example, at block 308, the group management engine 202a may send an access point IHS group controller designation request through the network 204 to the administrator IHS 212 in response to determining the access point IHS group for a plurality of access point IHSs that include the first access point IHS. In response to receiving the access point IHS group controller designation request, the administrator user of the administrator IHS 212 may respond with (and the group management engine 202a may receive) an access point IHS group controller designation that designates one of the plurality of access point IHSs in that access point IHS group as the access point IHS group controller. In some embodiments, in response to receiving the access point IHS group controller designation request, the administrator user of the administrator IHS 212 may respond with (and the group management engine 202a may receive) an access point IHS group controller priority designation that designates a primary access point IHS group controller and at least one secondary access point IHS group controller from the plurality of access point IHSs in the access point IHS group.

The method 300 then proceeds to block 310 where the access point group and access point group controller are identified to the first access point IHS. In an embodiment, at block 310 the group management engine 202a sends an identifier for the access point IHS group determined at block 306 and an identifier for the access point IHS group controller determined at block 308 through the network 204 to the access point IHS 206a (i.e., the first access point IHS). In some embodiments, at block 310 the group management engine 202a may send an access point IHS group controller priority over the network to the access point IHS 206a (i.e., the first access point IHS). As such, following block 310, the first access point IHS that sent the group request at block 304 receives the identity of the access point IHS group to which it belongs, and the identity of the access point IHS group controller for that access point IHS group. In some embodiments, the first access point IHS may receive an access point IHS group controller priority that is used to determine the identity of the access point IHS group controller for its access point IHS group, while in some embodiments, the first access point IHS may receive the identity of the access point IHS group controller for its access point IHS group along with an access point IHS group controller priority that it may use to determine an access point IHS group controller if the current access point IHS group controller fails or otherwise cannot perform its duties at the access point IHS group controller of the access point IHS group. The provisioning of the access point IHS group controller priority to each of the access point IHSs in an access point IHS group provides for fast failover recovery in the event the access point IHS that is operating as the access point IHS group controller for the access point IHS group fails. However, in other embodiments, each of the access point IHSs in an access point IHS group may be instructed to contact the group management engine 202*a* in the group management IHS in the event of the failure of the access point IHS that is acting as the access point IHS group controller, and the group management engine 202*a* will then determine which of the remaining access point IHSs in the access point IHS group is now the access point IHS group controller and provide the identity of that access point IHS to each of the other access point IHSs remaining in the access point IHS group. As such, in some embodiments, the group management engine 202*a* may monitor the access point IHS that is operating as the access point IHS group controller for an access point IHS group to determine whether that access point IHS goes offline, fails, or otherwise is not able to act as the access point IHS group controller.

As would be understood by one of skill in the art in possession of the present disclosure, upon receiving the identity of an access point IHS group/virtual controller group and access point IHS group controller/virtual controller, the first access point IHS may operate as part of the access point IHS group/virtual controller group, receive and execute control commands from the access point IHS group controller/virtual controller, and/or act as the access point IHS group controller/virtual controller by monitoring other access point IHSs and sending control commands. Subsequent to receiving the identity of an access point IHS group/virtual controller group and access point IHS group controller/virtual controller, the access point IHS may request configuration, firmware, and any other run time parameters needed for real time operation from the access point IHS group controller. Furthermore, the method 300 may be performed by the group management engine 202*a* with any number of access point IHSs in substantially the same manner as described above to identify access point IHS groups and access point IHS group controllers to those access point IHSs.

Thus, systems and methods have been described that provide for grouping access point IHSs without the need for a discovery and configuration broadcast protocol, and while enabling the grouping of access point IHSs that may be provided by different vendors/manufacturers and that may be geographically disperse and connected to different infrastructures. One specific example of a use case for the systems and methods of the present disclosure includes an airport network access system that utilizes access point IHSs in different airports to provide users Wi-Fi access to the Internet at those different airports via a single set of access credentials, but other examples (e.g., corporate network access at different physical locations, etc.) will realize similar benefits and will fall within the scope of the present disclosure. Furthermore, the systems and methods provide the ability to manage the access point IHSs and their access point groups via the administrative IHS from virtually anywhere in the world that has access to the network that is connected to the group management IHS.

Although illustrative embodiments have been shown and described, a wide range of modification, change and substitution is contemplated in the foregoing disclosure and in some instances, some features of the embodiments may be employed without a corresponding use of other features. Accordingly, it is appropriate that the appended claims be construed broadly and in a manner consistent with the scope of the embodiments disclosed herein.

What is claimed is:

1. An access point information handling system (IHS) group management system, comprising:
    a network;
    a plurality of access point IHSs coupled to the network;
    a group management IHS that is coupled to the plurality of access point IHSs through the network, wherein the group management IHS includes a group configuration database, and wherein the group management IHS:
        receives a group request from a first access point IHS of the plurality of access point IHSs through the network;
        retrieves group configuration information from the group configuration database using information about the first access point IHS;
        determines an access point IHS group using the group configuration information, wherein the access point IHS group includes the first access point IHS and at least one second access point IHS of the plurality of access point IHSs;
        determines an access point IHS group controller that is one of the first access point IHS and the at least one second access point IHS; and
        identifies the access point IHS group and the access point IHS group controller to the first access point IHS through the network.

2. The access point IHS group management system of claim 1, further comprising:
    a switch IHS coupled to the group management IHS through the network, wherein the group management IHS:
        determines the access point IHS group using the group configuration information, wherein the access point IHS group includes the first access point IHS, the at least one second access point IHS, and the switch IHS.

3. The access point IHS group management system of claim 1, wherein the information about the first access point IHS that is used to retrieve the group configuration information includes a first media access control (MAC) address for the first access point IHS, and wherein the group configuration information includes a plurality of MAC addresses for access point IHSs that are included in the access point IHS group.

4. The access point IHS group management system of claim 1, wherein the information about the first access point IHS that is used to retrieve the group configuration information includes at least one non-address characteristic for the first access point IHS, and wherein the group configuration information includes at least one non-address characteristic for access point IHSs that are included in the access point IHS group.

5. The access point IHS group management system of claim 1, wherein the group management IHS:
    determines an access point IHS group controller priority that includes the access point IHS group controller as a primary access point IHS group controller, and at least one secondary access point IHS group controller; and
    identifies the access point IHS group controller priority to the first access point IHS through the network.

6. The access point IHS group management system of claim 1, further comprising:

an administrative IHS coupled to the group management IHS through the network, wherein the group management IHS determines the access point IHS group controller by:
sending an access point IHS group controller designation request to the administrative IHS through the network; and
receiving an access point IHS group controller designation from the administrative IHS through the network.

7. The access point IHS group management system of claim 1, further comprising:
an administrative IHS coupled to the group management IHS through the network, wherein the group management IHS:
receives the group configuration information from the administrative IHS through the network; and
stores the group configuration information in the group configuration database.

8. An information handling system (IHS), comprising:
a database storing group configuration information;
a network interface coupled to a network;
a processing system coupled to each of the database and the network interface; and
a non-transitory, computer-readable medium including instructions that, when executed by the processing system, cause the processing system to provide a group management engine that:
receives a group request from a first access point IHS through the network using the network interface;
retrieves the group configuration information from the database using information about the first access point IHS;
determines an access point IHS group using the group configuration information, wherein the access point IHS group includes the first access point IHS and at least one second access point IHS that is coupled to the network;
determines an access point IHS group controller that is one of the first access point IHS and the at least one second access point IHS; and
identifies the access point IHS group and the access point IHS group controller to the first access point IHS through the network using the network interface.

9. The IHS of claim 8, wherein the group management engine:
determines the access point IHS group using the group configuration information, wherein the access point IHS group includes the first access point IHS, the at least one second access point IHS, and a switch IHS that is coupled to the network.

10. The IHS of claim 8, wherein the information about the first access point IHS that is used to retrieve the group configuration information includes a first media access control (MAC) address for the first access point IHS, and wherein the group configuration information includes a plurality of MAC addresses for access point IHSs that are included in the access point IHS group.

11. The IHS of claim 8, wherein the information about the first access point IHS that is used to retrieve the group configuration information includes at least one non-address characteristic for the first access point IHS, and wherein the group configuration information includes at least one non-address characteristic for access point IHSs that are included in the access point IHS group.

12. The IHS of claim 8, wherein the group management engine:
determines an access point IHS group controller priority that includes the access point IHS group controller as a primary access point IHS group controller, and at least one secondary access point IHS group controller; and
identifies the access point IHS group controller priority to the first access point IHS through the network using the network interface.

13. The IHS of claim 8, wherein the group management engine determines the access point IHS group controller by:
sending an access point IHS group controller designation request to the administrative IHS through the network using the network interface; and
receiving an access point IHS group controller designation from the administrative IHS through the network using the network interface.

14. The IHS of claim 8, wherein the group management engine:
receives the group configuration information from an administrative IHS through the network using the network interface; and
stores the group configuration information in the database.

15. A method for grouping access point information handling systems (IHSs), comprising:
receiving, by a group management IHS from a first access point IHS through a network, a group request;
retrieving, by the group management IHS from a group configuration database, group configuration information using information about the first access point IHS;
determining, by the group management IHS using the group configuration information, an access point IHS group that includes the first access point IHS and at least one second access point IHS that is coupled to the network;
determining, by the group management IHS, an access point IHS group controller that is one of the first access point IHS and the at least one second access point IHS; and
identifying, by the group management IHS to the first access point IHS through the network, the access point IHS group and the access point IHS group controller.

16. The method of claim 15, further comprising:
determining, by the group management IHS using the group configuration information, the access point IHS group, wherein the access point IHS group includes the first access point IHS, the at least one second access point IHS, and a switch IHS that is coupled to the network.

17. The method of claim 15, wherein the information about the first access point IHS that is used to retrieve the group configuration information includes a first media access control (MAC) address for the first access point IHS, and wherein the group configuration information includes a plurality of MAC addresses for access point IHSs that are included in the access point IHS group.

18. The method of claim 15, wherein the information about the first access point IHS that is used to retrieve the group configuration information includes at least one non-address characteristic for the first access point IHS, and wherein the group configuration information includes at least one non-address characteristic for access point IHSs that are included in the access point IHS group.

19. The method of claim 15, further comprising:
determining, by the group management IHS, an access point IHS group controller priority that includes the access point IHS group controller as a primary access point IHS group controller, and at least one secondary access point IHS group controller; and identifying, by the group management IHS to the first access point IHS through the network, the access point IHS group controller priority.

20. The method of claim 15, further comprising:

receiving, by the group management IHS from an administrative IHS through the network, the group configuration information; and storing, by the group management IHS in the group configuration database, the group configuration information.

\* \* \* \* \*